Aug. 5, 1952     A. R. HAVENER     2,605,792
SCREW DRIVING MACHINE
Filed April 4, 1947     4 Sheets-Sheet 3
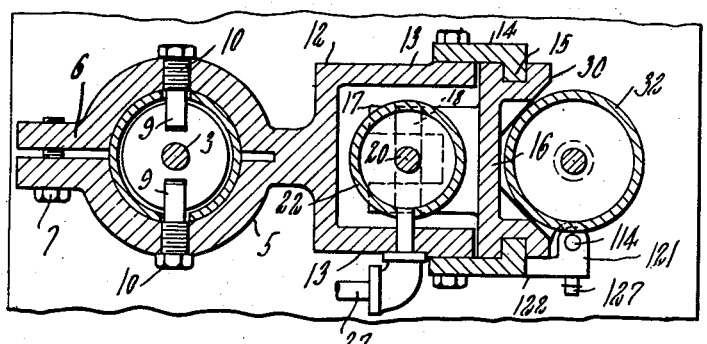
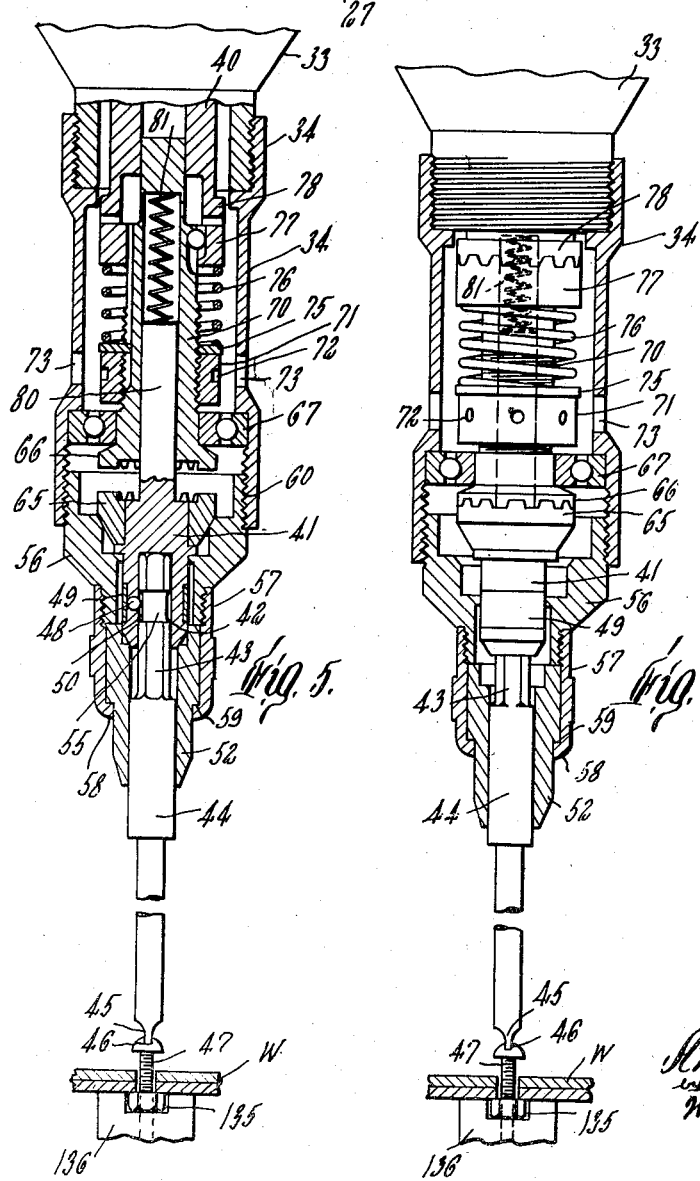

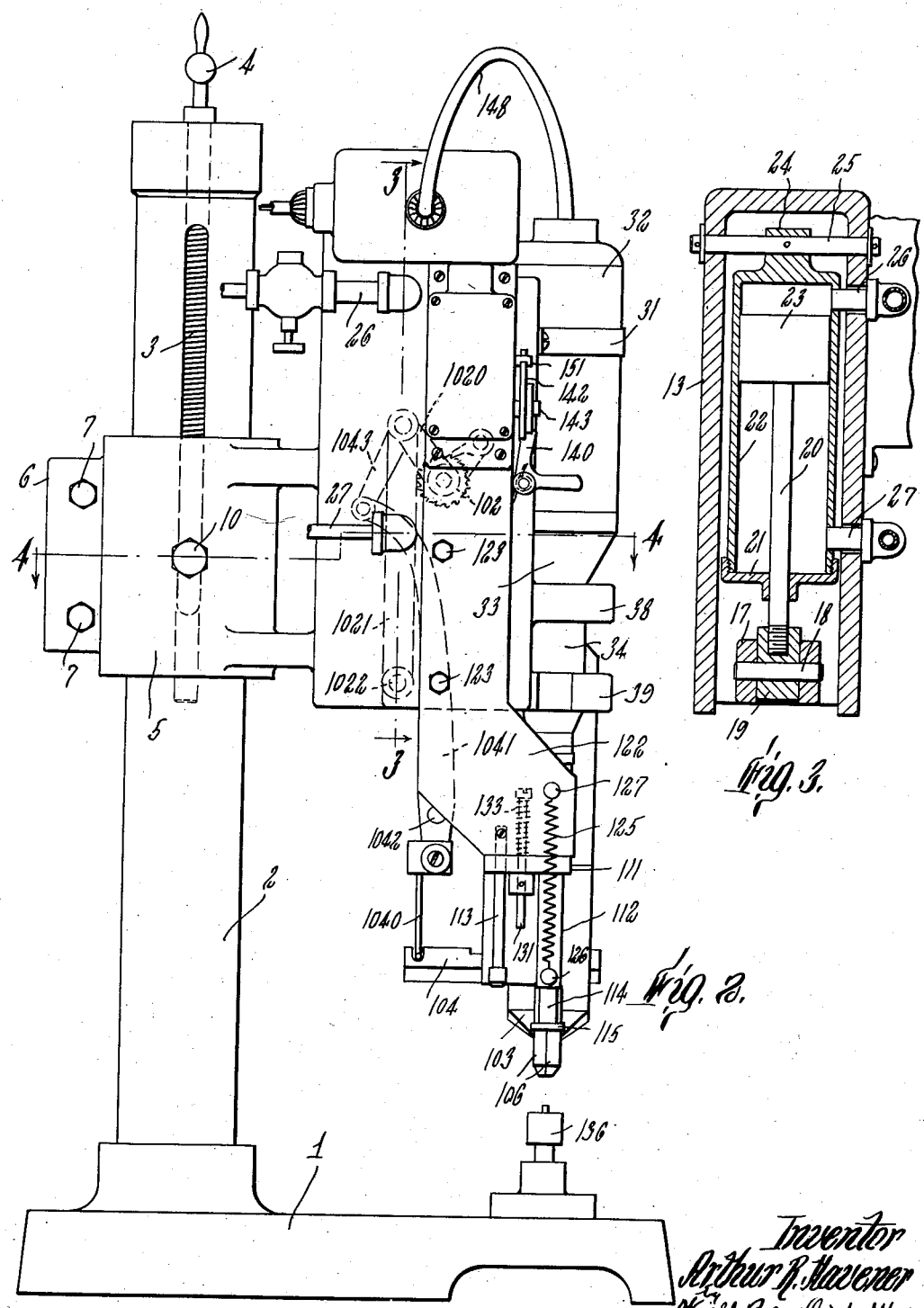

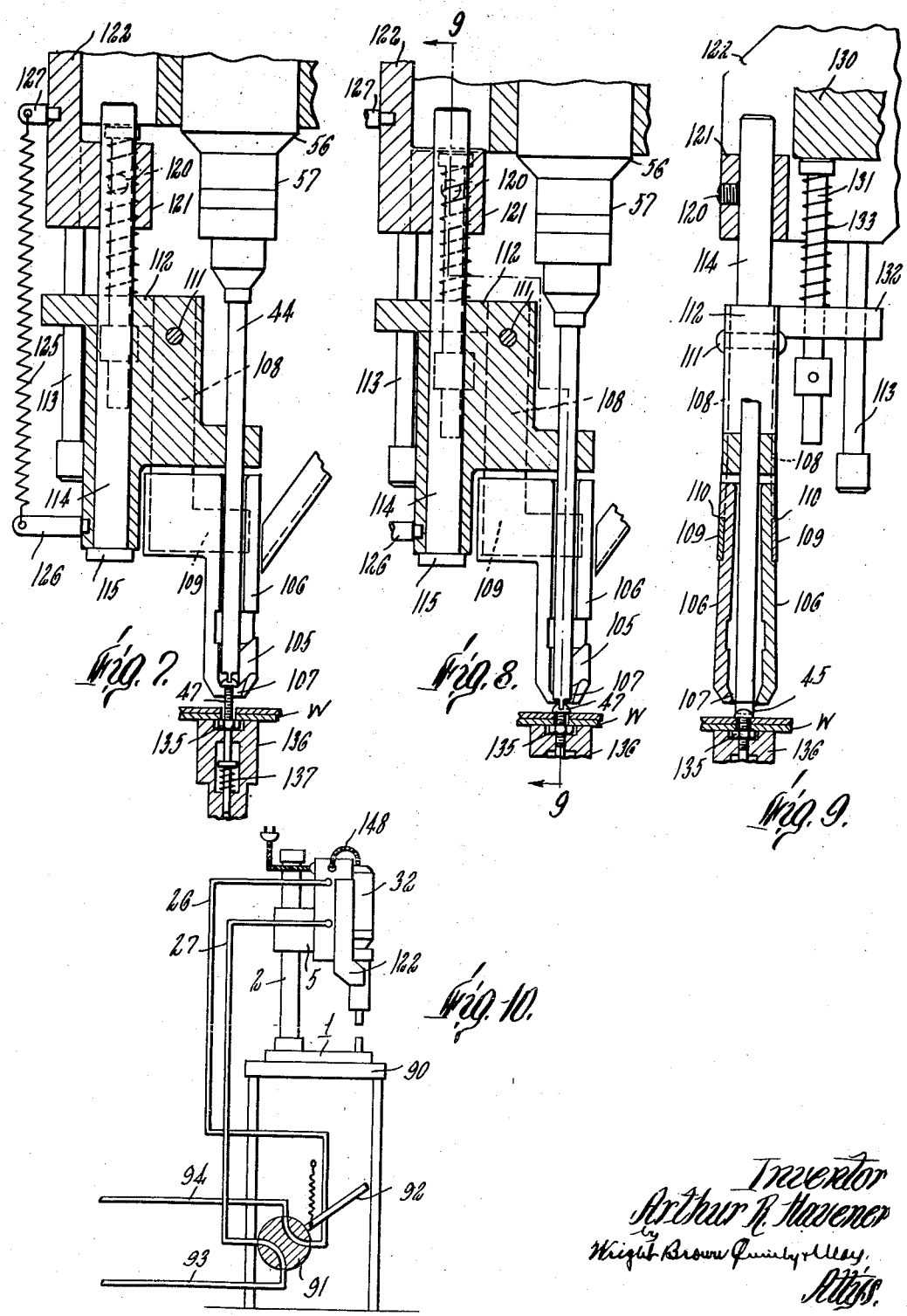

Patented Aug. 5, 1952

2,605,792

UNITED STATES PATENT OFFICE 2,605,792

SCREW DRIVING MACHINE

Arthur R. Havener, Wayland, Mass., assignor to Judson L. Thomson Manufacturing Company, Waltham, Mass., a corporation of Massachusetts Application April 4, 1947, Serial No. 739,308

2 Claims. (Cl. 144—32)

This invention relates to machines for driving screws and has for an object the production of such a machine of compact construction.

A further object is to provide a direct motor drive for the screw driver.

Still another object is to provide a machine wherein the entire driving mechanism is moved by power under accurate control by the operator.

A further object is to improve the control of the screws from the initial feed until the screw is driven so as to provide against failure to drive or improper driving of the screw.

For a complete understanding of this invention, reference may be had to the accompanying drawings in which Figure 1 is a front elevation of a machine embodying the invention.

Figure 2 is a left side elevation of the same.

Figures 3 and 4 are detail sectional views on lines 3—3 and 4—4, respectively, of Figure 2.

Figure 5 is a detail sectional view on line 5—5 of Figure 1, but showing a screw at the start of the driving operation and before power drive has commenced.

Figure 6 is a view somewhat similar to Figure 5, but with certain parts shown in elevation and with the clutches closed and the screw being power driven.

Figure 7 is a view similar to a portion of Figure 1, but with parts omitted and certain parts in section and showing a screw in position to be driven.

Figure 8 is a view similar to Figure 7, but showing the parts at the end of the driving operation but while the screw driver is still in engagement with the driven screw.

Figure 9 is a detail sectional view on line 9—9 of Figure 8.

Figure 10 is a diagrammatic view of the machine and the raising and lowering mechanism for the screw driver.

Figure 1:
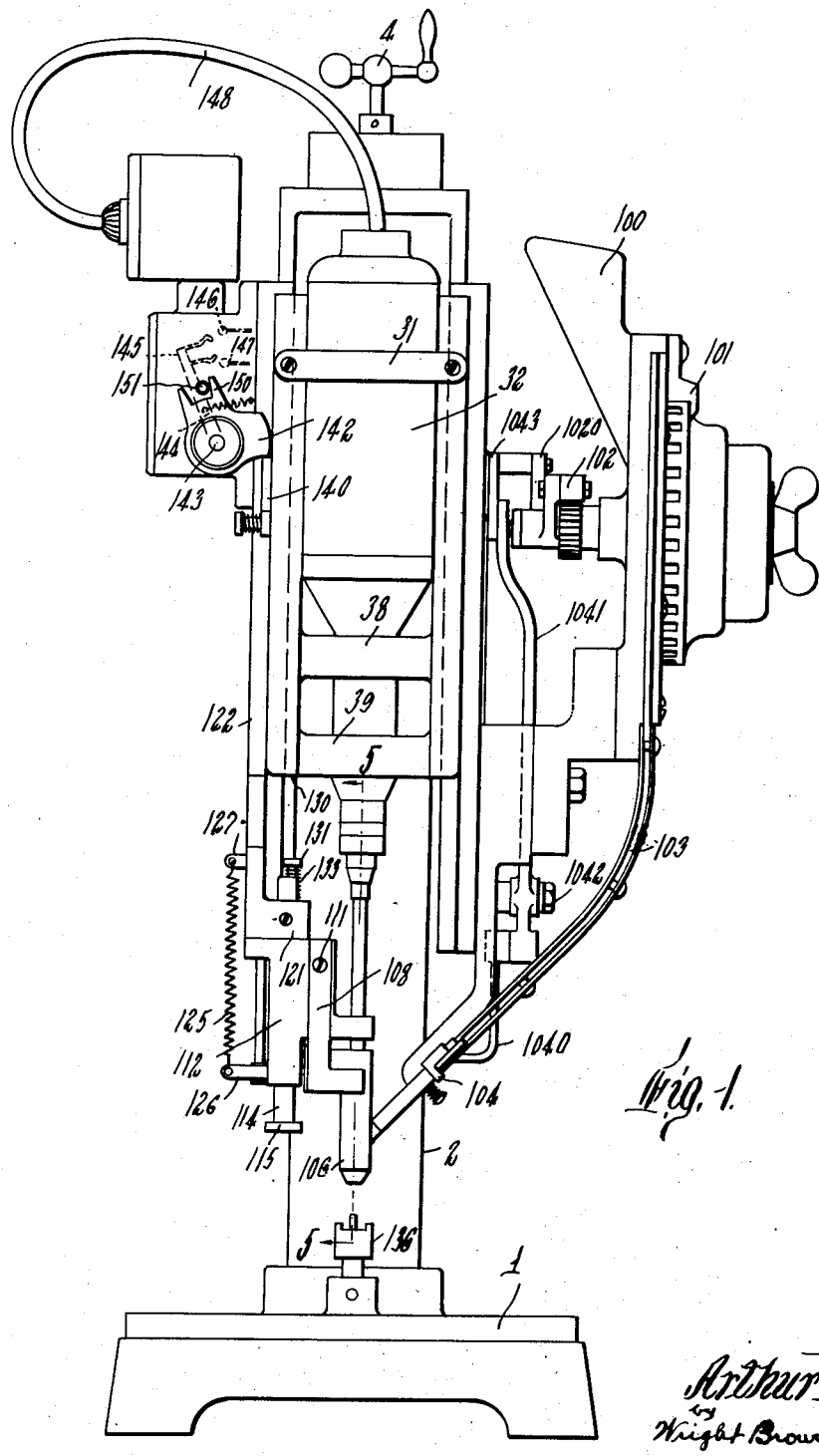

Referring to the drawings, at 1 is indicated a support. From the back portion of this support arises an upstanding post 2. This post is hollow and has journaled coaxially therein a screw 3 provided with an actuating handle 4 at its upper end. On the post is slidably mounted a bracket 5 having a split portion 6, the sides of which may be clamped together as by tightening screws 7 extending through one of the sides and threaded into the other. Threaded on the screw 3 and within the post 2 is a nut 8 (see Figure 4) into which extend the inner unthreaded ends 9 of a pair of screws 10 threaded through the sides of the bracket 5. Thus by loosening the screws 7 and turning the handle 4, the height of the bracket 5 from the forward portion of the support 1 may be adjusted as desired, after which by tightening the screws 7 the bracket may be securely fixed in adjusted position.

The bracket 5, as shown best in Figure 4, has a channel-shaped portion 12 to the side walls 13 of which are secured angle members 14, the inturned flanges 15 of which are spaced from the forward face of the walls 13 to form ways in which a carriage 16 is vertically slidable. This carriage 16 has a forked portion 17 projecting rearwardly between the side walls 13 and between the branches of this fork is pivoted on the cross pin 18, a cross head 19 secured to the lower end of a piston rod 20. This piston rod 20 is slidably mounted through the head 21 of a cylinder 22 and has fixed at its upper end a piston 23 riding within the cylinder. The upper end wall of the cylinder has an extension 24 which is secured to the bracket 5, as by a cross pin 25, which extends through the side walls 13 of the bracket 5. By admitting fluid under pressure above or below the piston 23, this piston may be lowered or raised, causing corresponding motion of the carriage 16. Fluid pressure connections to the cylinder 22 above and below the piston 23 comprise the pipes 26 and 27 which extend out through one of the walls 13 where they are connected to a suitable source of fluid pressure as will later appear. The carriage 16 has a pair of forwardly and outwardly projecting flanges 30 which slidably engage the forward faces of the members 15.

To the carriage 16 there is clamped, as by a clamping strap 31, a unit comprising a cylindrical motor casing 32 having a tapered lower end 33 to which is threaded a tubular extension 34. This extension 34 may project downwardly through holes in a pair of spaced cross frame members 38 and 39 of the carriage. These cross frame members 38 and 39 and the strap 31 removably secure the unit comprising the motor casing 32 and the extension 34 to the carriage 16 so as to move therewith.

The tubular extension or sleeve 34, as shown best in Figures 5 and 6, carries a clutch mechanism which connects the motor rotor 40, extending below the motor casing 32, with a screw driver drive shaft 41, at the lower end of the sleeve 34. This shaft 41 has a polygonal socket 42 in its lower end into which may be inserted the correspondingly shaped shank 43 of the screw driver 44 having the usual bit 45 at its lower end for engagement in the slot 46 of the head of the screw 47 to be driven. This screw driver shank is removably held in the socket 42 by means of a latch ball 48 backed up by a circular spring 49 surrounding the driver shaft 41, the ball riding in a reduced portion 50 of the screw driver.

The screw driver 44 is slidably and rotatably mounted within a sleeve 52 held to a cap 56 by a sleeve 57 threaded on the lower end of the cap and having an inturned flange 58 engaging beneath a shoulder 59 on the sleeve 52. The cap 56, in turn, is internally threaded as at 60 into the lower end of the extension 34. The driving shaft 41 carries one portion 65 of a toothed clutch, the mating portion 66 of which is journaled in a ball bearing 67 carried by the extension 34. Above the ball bearing 67 the clutch member 66 is provided with an externally threaded shank 70 on which is threaded a nut 71 having peripheral holes 72 therein which can be reached through openings 73 through the extension 34 by a tool, by which the nut 71 may be turned to adjust it axially on the shank portion 70. This nut 71 supports a washer 75 on which is seated a coil spring 76. The upper end of the spring 76 supports a clutch collar 77 keyed on the shank 70 and having inclined clutch teeth which may mesh with a mating clutch portion 78 on the lower end of the rotor 40.

The clutch faces of the parts 77 and 78 are yieldingly held in contact by the spring 76, but when a sufficient torque is exerted between these parts, the clutch element 77 will be forced away from mating relation to the clutch portion 78 against the pressure of the spring 76 and rotarily disconnect the rotor 40 from the sleeve 70. The drive shaft 41 is slidable relative to the clutch member 66 and for this purpose, and for centering the two relative to each other, it is provided with a central reduced diameter extension 80 slidable through the portion 70 but normally pressed downwards as by a spring 81 bearing on its upper end. When the carriage with the motor and screw driver are lowered until the lower end of the screw driver contacts the head of the screw, further lowering pressure, which stops the further descent of the screw driver, lowers the clutch element 66 into engagement with the clutch element 65. The motor being rotated and the clutch elements 77 and 78 being in driving contact by reason of the pressure of the spring 76, and therefore rotating, this produces a power rotation of the drive shaft 41 and the screw driver, which thus acts to screw the screw 47 into the work which is supported beneath the screw driver on the support 1. As soon as the screw is fully driven and is stopped from further rotation, the resistance to turning thus imposed on the clutch element 77 causes this clutch element to be retracted against the pressure of the spring 76, operatively disconnecting the motor rotor 40 from the clutch element 77. The operator then causes the carriage to be lifted to remove the screw driver from the screw, this permitting the clutch element 65 to drop out of contact with the driving clutch element 66, and permitting the spring 76 to return the clutch element 77 into driven relation to the clutch element 78, the clutch element 77 being keyed to the portion 70 so that when it is rotated, the upper clutch element 66 is also rotated.

The up and down motion of the carriage which is controlled by fluid pressure supplied to and discharged from the cylinder 22 is controlled by the operator by means illustrated in Figure 10. The machine is supported on a table or bench 90 and beneath this is a four-way valve 91 controlled by a foot pedal 92. By depressing this foot pedal, fluid pressure from a suitable source (not shown) delivered to the pipe 93, is conducted through the valve 91 to the pipe 26, while the pipe 27 from the lower portion of the cylinder 22 is connected through the valve 91 to the discharge pipe 94. This causes the carriage with the screw driver mechanism to descend to drive the screw. On the completion of the driving operation, the operator removes pressure from the pedal 92, which is allowed to rise, connecting the pipe 26 to discharge and the pipe 27 to pressure supply in the position shown in Figure 10, whereupon the carriage is lifted to its upper position preparatory to another screw driving operation.

Screws are delivered one by one from a suitable supply hopper 100 through a rotary selector 101 of well known construction and which may be actuated by a ratchet mechanism at 102 having a crank arm 1020, connected through a link 1021 at 1022 to a portion of the carriage 16 so that the reciprocation of the carriage intermittently rotates the selector mechanism and supplies screws to the raceway 103. At 104 is a conventional separator which acts to permit but a single screw to pass through the raceway at a time to the driving mechanism. This separator 104 is connected through a spring arm 1040 to the lower end of a lever 1041 fulcrumed at 1042 and connected at its upper end through a link 1043 with the crank arm 1020. This delivery of the individual screws is through mating slots 105 in a pair of jaws 106 (see Figure 9) which are arranged lengthwise of the screw driver 44 and when in their upper positions the slots 105 are opposite to the delivery end of the separator 104 in the position shown in Figures 1 and 2. These jaws 106 have in-turned beveled faces 107 (Figure 9) which are adapted to engage beneath the head of the screw 47 but which may be separated by pressure from the head of the screw and from the lower end of the screw driver to permit this screw to pass out from between them. These jaws 106 are supported on angle-shaped leaf springs 108, the lower ends of which are formed with arms 109 extending into slots 110 on the outer faces of the jaws. The upper ends of these leaf springs 108 are secured as by a rivet 111 to a supporting block 112 which is slidably guided for vertical motion on a pin 113 and on a second pin 114 having a head 115 at its lower end which limits the downward motion of the block. This pin 114 may be fixed in adjusted vertical position as by a set screw 120 extending through an inwardly projecting boss 121 at the lower end of a plate 122 secured to the bracket 12 as by the screws 123. The block 112 is normally held elevated as by a spring 125 reacting between a pair of pins 126 and 127, the pin 126 projecting from the block 112 and the pin 127 projecting from the plate 122. This elevated position is shown in Figure 1.

As the carriage 16 descends, a portion 130 thereof, as shown in Figure 9, impinges upon the head of a pin 131 mounted for vertical sliding motion through an extension 132 of the block 112 and surrounded by a heavy spring 133 which reacts between the head of the pin 131 and the extension 132. Depression of this pin 131 acts to impart downward pressure through the spring 133 against the extension 132 and overcomes the tension of the spring 125, thus lowering the block 112 until it is stopped by impingement on the head 115 as shown in Figures 7 and 8. In this position of the parts the jaws 106 are at their downward limit of motion slightly above the level of the work W and in position to present the lower end of the screw 47 in position to engage in the work, as shown. Where a nut 135 is in position to receive the end of the screw, this nut and the work piece are preferably supported on a work support 136 having a spindle retractible against the tension of a spring 137, as shown in Figure 7.

As the carriage is so lowered, a cam 140 carried thereby (see Figure 1) moves away from an arm of a bell crank lever 142 fixed to a switch shaft 143, permitting a spring 144 acting on a switch arm 145 carried by this shaft to swing inwardly and make a contact with the terminals 146 and 147. This establishes an electric circuit through the flexible cable 148 to the motor which has the casing 33, starting the rotation of this motor and through it rotating the clutch member 66. This serves to drag around frictionally therewith the screw driver, the lower end of which is then free to find the slot in the screw head and fall thereinto by gravity. As the carriage continues to descend after the stopping of the block 112 by impingement on the head 115, further compressing the spring 133 shown in Figure 9, the screw driver, being held from further descent by its engagement with the screw head, causes the relative lifting of the clutch element 65 until it engages the clutch element 66, whereupon the screw driver is rotated by the motor and the screw is driven tight. As soon as the screw is driven tight, which stops further rotation of the screw and the screw driver, the clutch element 77 yields away from the clutch element 78, disconnecting the power drive of the screw driver, whereupon the operator releases his foot from the treadle 92 and allows the fluid pressure to lift the carriage, retracting the screw driver. Through the action of the bell crank lever 142, the arm 150 of the bell crank lever engaging a projection 151 on the switch arm, opens the switch, breaking the contacts at 146 and deenergizing the motor. When the screw driver retracts after the block 112 has been fully retracted by the action of its spring 125, it uncovers the passage 105 and permits the succeeding screw released by the screw separator to pass down between the jaws into alinement with the driver and in position for the succeeding driving operation, in the position shown in Figure 1.

From the foregoing description of an embodiment of this invention, it should be evident to those skilled in the art that various changes and modifications might be made without departing from its spirit or scope.

I claim:

1. In combination, a support, a post upstanding from said support, a bracket carried by said post, said bracket having an upright housing provided with an upright way at its forward face, a carriage mounted for motion along said way and having a portion extending into said housing, a fluid pressure mechanism comprising a cylinder and piston enclosed within said housing, said cylinder being pivoted between the sides of said housing, said piston having a rod connected to said carriage portion, a vertical spindle carried by said carriage, a tool carried by said carriage in vertical alinement with said spindle and connected for actuation by said spindle, and operator controlled means for admitting and discharging fluid pressure with respect to said cylinder to lower and raise said carriage and the tool carried thereby.

2. In combination, a support, a post upstanding from said support, a bracket carried by said post, said bracket having an upright housing provided with an upright way at its forward face, a carriage mounted for motion along said way and having a portion extending into said housing, a fluid pressure mechanism comprising a cylinder and piston enclosed within said housing, said cylinder being pivoted between the sides of said housing, said piston having a rod connected to said carriage portion, a rotary motor for driving said spindle also carried by said carriage, and operator controlled means for admitting and discharging fluid pressure with respect to said cylinder to lower and raise said carriage and the parts carried thereby.

ARTHUR R. HAVENER.

REFERENCES CITED

The following references are of record in the file of this patent:

UNITED STATES PATENTS

| Number | Name | Date |
| --- | --- | --- |
| 1,431,749 | Newman | Oct. 10, 1922 |
| 1,578,232 | Ferris | Mar. 23, 1926 |
| 1,624,189 | Steen | Apr. 12, 1927 |
| 1,754,978 | Buss | Apr. 15, 1930 |
| 1,774,030 | McLaughlin | Aug. 26, 1930 |
| 1,977,490 | Sawyer | Oct. 16, 1934 |
| 1,984,282 | Ray | Dec. 11, 1934 |
| 2,215,287 | Fox et al. | Sept. 17, 1940 |
| 2,260,327 | McKee | Oct. 28, 1941 |
| 2,390,524 | Eckener | Dec. 11, 1945 |